United States Patent [19]
Arenas et al.

[11] Patent Number: 4,598,466
[45] Date of Patent: Jul. 8, 1986

[54] FEEDTHROUGH

[75] Inventors: Alvaro Arenas, Miami; Thomas O. Bales, Coral Gables; John W. Box, Miami, all of Fla.

[73] Assignee: Cordis Corporation, Miami, Fla.

[21] Appl. No.: 672,339

[22] Filed: Nov. 16, 1984

[51] Int. Cl.[4] .............................................. H01M 2/06
[52] U.S. Cl. .................... 29/623.2; 429/180; 429/181
[58] Field of Search ............... 429/181, 184, 180, 178, 429/185; 128/419 P, 419 PS; 29/623.2; 174/50-62

[56] References Cited

U.S. PATENT DOCUMENTS

| | | | |
|---|---|---|---|
| 3,649,367 | 3/1972 | Purdy | 136/202 |
| 3,874,929 | 4/1975 | Greatbatch | 429/181 X |
| 4,048,392 | 9/1977 | Garoutte | 429/184 X |
| 4,168,351 | 9/1979 | Taylor | 429/181 X |
| 4,233,372 | 11/1980 | Bro et al. | 429/181 X |
| 4,236,525 | 12/1980 | Sluetz et al. | 128/419 P |
| 4,421,833 | 12/1983 | Zayatz | 429/181 X |

Primary Examiner—Anthony Skapars
Attorney, Agent, or Firm—Lockwood, Alex, Fitzgibbon & Cummings

[57] ABSTRACT

A feedthrough is provided for mounting in and electrically insulating a conductive wire from the casing of a device such as a battery cell for a cardiac pacer. The feedthrough is a non-glass member at least a portion of which was cured in situ and formed to a shape and size generally complementary to the shape and size of the casing opening through which it is mounted and to the shape and size of the conductive wire that it mounts.

14 Claims, 5 Drawing Figures

FEEDTHROUGH

DESCRIPTION

This invention generally relates to an improved feedthrough, more particularly to providing a polymeric feedthrough or insulating bushing that seals an opening through the wall of the case of an electronics instrument. In an important aspect of the invention, the feedthrough device is at least partially formed in situ within an opening through a wall of a sealed container such as that of a lithium battery cell or a pacemaker case or can, and a conductive wire exits the container or case through the feedthrough device.

Certain devices have substantially closed cases which must provide a secure and substantially impermeable barrier to prevent the passage of corrosive materials and the like therethrough. In many applications, the corrosive material is included within the container or case, such as when the article is a battery cell, particularly a lithium battery cell for powering pacemakers. Other articles along these lines include the cardiac pacers themselves that include feedthroughs between the case or can and the encapsulated connector assembly wherein an epoxy, an acrylic or the like provides a sealed encasement for the structures and circuitry that receive the pacer leads.

Although the properties of substantial impermeability and secure sealing are extremely important elements of these types of devices, they are also characterized by the need to have a conductive wire or the like pass through the case. Such passthrough or feedthrough function must be effected in a manner that maintains the integrity of the case, in some instances this integrity being hermetic. Even when a hermetic or gas barrier seal is not required, it is critical to these types of feedthroughs and cases that they be substantially impervious to attack by corrosive materials such as the electrolyte within a battery cell container or corrosive environments within which the container may be implanted, such as salt water.

Furthermore, since these containers are typically highly electrically conductive and since the conduit wire mounted within the feedthrough is also highly conductive, it is extremely important that the feedthrough itself provide excellent electrical insulation properties. In the past, attempts to achieve these attributes have typically centered around the utilization of glass, ceramic or glass-ceramic materials as the principal feedthrough material. While glasses and ceramics have provided excellent feedthroughs, the use of glass or ceramic material in feedthroughs brings with it certain undesirable properties and disadvantages.

Glass and the like is brittle, and it is susceptible to cracking or to thermal shock. Glass is not necessarily totally impervious to corrosive materials including certain battery cell electrolytes and can react with lithium battery components thereby mechanically weakening the glass feedthrough. Feedthroughs of glass and the like are formed at glass-melting temperatures of between about 1400° and 1700° F., which requires special glass forming facilities. Such high temperatures can result in sensitization, which is a depletion of chromium in stainless steel out of which the cases may be made. Glass and the like limits the choice of metal out of which the wire conductor and case can be made. Accurate placement of the wire conduit is significantly reduced because the flow of heated glass tends to cause the wire to move from its desired centered position.

There is accordingly a need for feedthroughs and cases having same, which feedthroughs possess all of the desirable properties of glass, while not exhibiting its undesirable properties, including its susceptibility to cracking, thermal shock, attack by some caustic materials and need to be formed at high temperatures. Such results have been attained by the present invention which eliminates the need for incorporating glass or ceramic material within a feedthrough. The present invention includes in situ forming of at least a portion of a feedthrough member directly within an opening through the case or container, the in situ forming including inserting polymeric material within and in contact with this opening through the wall of the container or case and then curing this polymeric material therewithin in order to form a completed feedthrough that has an electrically conductive wire conduit mounted therethrough and adhered thereto, the feedthrough also being tightly fit within and adhered to the wall of the opening.

It is accordingly a general object of the present invention to provide an improved feedthrough member and case or container incorporating such feedthrough member.

Another object of this invention is to provide an improved feedthrough member and case having same, which feedthrough member exhibits substantially all of the advantages of a glass feedthrough member while avoiding some of its shortcomings.

Another object of the present invention is to provide an improved feedthrough and container having same, which feedthrough is not susceptible to deterioration due to its brittleness or thermal shock, including having enough strength and flexibility to resist damage when subjected to physical forces such as those brought about by shrinkage of adjacent materials or by other physical contact or when subjected to corrosive environments such as lithium battery cell components.

Another object of this invention is to provide an improved feedthrough and container incorporating same wherein the feedthrough is either partially or totally formed in situ, generally at much lower temperatures than glass sealing temperatures, such that it adheres to the wire conductor mounted thereby and walls of the opening that mount the feedthrough.

Another object of this invention is to provide an improved case and feedthrough or insulating bushing which is prepared in a manner that very precisely centers or otherwise accurately positions the wire passed therethrough.

Another object of the present invention is to provide an improved feedthrough that broadens the choice of metals of the wires mounted thereby.

Another object of the present invention is to provide an improved feedthrough and case including same, which feedthrough is cured near room temperature or at much lower temperatures than glass sealing temperatures to eliminate the disadvantages of elevated temperatures needed to effect glass flow.

These and other objects of the present invention will be apparent from the following description of this invention, taken in conjunction with the accompanying drawings, wherein.

Figure 1:
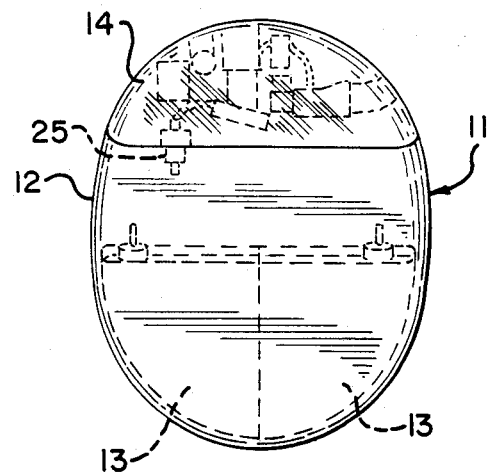
FIG. 1 is a perspective view of a cardiac pacer having two battery cells therewithin and exhibiting the improved feedthrough structure according to this invention.
Figure 2:
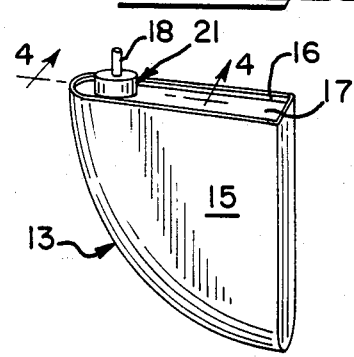
FIG. 2 is a perspective view of a battery cell as generally illustrated in FIG. 1.

Feedthroughs of the type according to the present invention are generally illustrated in FIG. 1 within the environment of a cardiac pacer, generally designated at 11, which pacer 11 includes an encasement 12, within which are mounted a pair of battery cells, generally designated as 13, the cardiac pacer 11 also including an encapsulated connector assembly 14. Typically, the encasement portion 12 is a can-like structure constructed of titanium or the like, and the encapsulated connector assembly 14 consists of a number of components encapsulated within an epoxy material or the like.

With more particular reference to the battery cell 13, such is typically a so-called lithium battery cell of the general type that is currently used for powering implanted cardiac pacers and which has a life of up to seven years or more. Case or container 15 of the battery cell 13 is typically constructed of deep drawn stainless steel, which case 15 has a mouth 16. A lid 17 is securely attached to the case or container 15 in order to fully close the mouth 16, the firm attachment being accomplished by tungsten inert gas welding, by laser welding or the like. A wire conduit 18, typically made of stainless steel, is securely mounted to and through an opening 19 of the lid 17 by means of a feedthrough, generally designated as 21.

Regarding the feedthrough 21, such is either partially or fully formed in situ by polymerizing and cross-linking a polymeric material or prepolymer in order to form a cross-linked polymer feedthrough. These cross-linked polymeric feedthroughs provide excellent electrical insulation or resistance and superior imperviousness to caustic materials such as lithium battery cell components, while being advantageously resistant to thermal and physical shock, including an ability to withstand exansion when cured in situ within the opening 19 through the stainless steel lid 17. These polymeric materials also cure and cross-link without the need to be subjected to as high an elevated temperature as needed for glass sealing techniques. Found to be especially suitable polymers for these feedthroughs are polyimides and polyphenylene sulfides. Other materials may be suitable, such as Parylene (a trademark Union Carbide), although this type of material, which is formed by evaporating a dimer under vacuum to form a monomer, is best suited for forming a thin coating layer rather than the entire feedthrough 21. Phenylene sulfide materials have been found to possess the strength, inertness and other properties desired to render same suitable for in situ formation of feedthrough 21.

Polyimide materials have been found to be especially suitable because of their availability because of their versatility, and because of their superior resistance to lithium battery cell components. Polyimide materials may be readily molded into components having substantial thicknesses, they can be cast from a solvent, or they can be formed through a powdered technique involving sintering, which can be particularly advantageous for making feedthroughs that have an especially complicated structure, such as those through which a plurality of wire conduits are passed. Polyimide materials exhibit a relatively low level of thermal expansion, substantial strength and flexibility whereby they will withstand expansion when they are cured in place.

Gas impermeability or hermetic properties are often believed to be important attributes of feedthroughs. While the various polymeric materials described herein are believed to be adequate for feedthroughs, enhanced hermetic properties are available by incorporating an appropriate filler within the polymeric material. Known fillers in this regard include salts such as beryllium oxide, magnesium oxide, alluminum oxide and the like. Fillers of this type also enjoy the potential of imparting enhanced mechanical strength to the filled polymer.

As previously indicated, the feedthrough 21 is at least partially formed in situ in order to form a feedthrough that it sized and configured so as to be in precise conformance with the size and the shape of the feedthrough opening 19, while simultaneously providing advantageous adherence of the feedthrough 21 to the walls of the opening 19 and to the wire conduit 18.

When the entire feedthrough 21 is formed in situ, an appropriate mold or press ram is positioned around the opening 19, and the polymeric material is fed thereinto for in situ curing to cross-link and/or polymerize the polymeric material into a completed polymeric feedthrough. After the polymeric material has been cured, the thus formed feedthrough 21, secured to the lid 17, is removed from the ram or mold. During curing, the polymeric material conforms to the shape and size of, and adheres to, both the opening 19 and the wire conduit 18. This substantially complete in situ formation can be carried out when the polymeric material is in powdered form and is compressed and/or sintered, or it can be cast from a solvent system and cured in place.

Alternatively, a preformed, but incomplete or undersized feedthrough component may be positioned within the opening 19, with the wire conduit 18 located within an oversized bore of the undersized feedthrough, which is made of a fully cross-linked and polymerized polymeric material as discussed herein. Next, that same polymeric material in substantially uncross-linked form is applied, typically within an organic solvent system, to the spacing between the undersized feedthrough and the opening 19 and between the oversized bore of the undersized feedthrough and the wire conduit 18. The applied polymeric material is then cured in order to form a complete feedthrough 21.

Inasmuch as the feedthrough 21 is either completely or partially formed in place, this invention provides an opportunity to easily form thereon indents, detents, undercut portions, ferrules and the like as desired. These types of structures are formed on the feedthrough 21 by providing complementary formations along the opening 19, along the wire conduit 18, or on the mold or press ram. As the formation of the feedthrough 21 is completed in situ, the polymeric material is flowed or pressed thereinto and cured in order to form the desired structure. Such structures are provided in order to enhance the security of the mounting of the feedthrough 21 or of the wire conduit 18.

Figure 3:
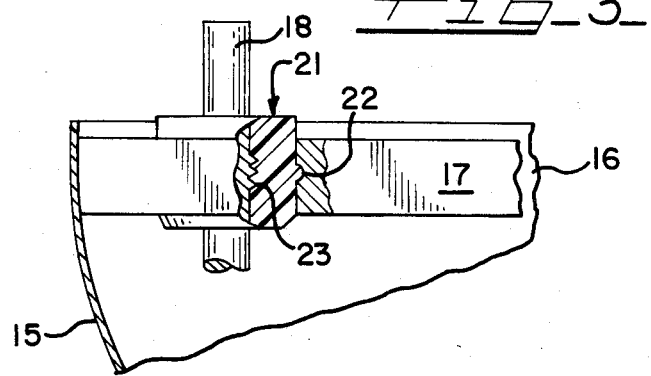
FIG. 3 is an elevational, enlarged detail view of a feedthrough mounted through a wall of the cell shown in FIG. 2, with portions broken away.
Figure 5:
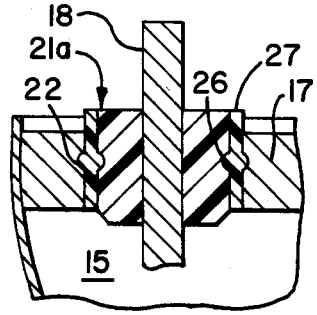
FIG. 5 is a cross-sectional view of a further embodiment.
Figure 4:
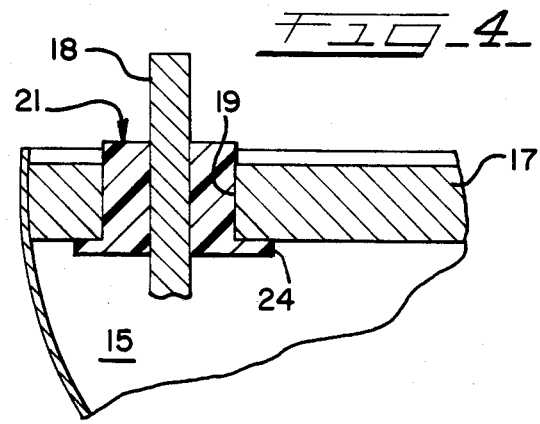
FIG. 4 is a cross-sectional view along the line 4—4 of FIG. 2.

For example, an undercut 22 and serrations 23 are illustrated in FIG. 3, and a ferrule 24 is illustrated in FIG. 4. FIG. 5 shows a feedthrough 21a that is partially formed in place from an incomplete or undersized feedthrough component that initially has an undercut 26. In order to illustrate this optional feature in the drawings, the portion of the feedthrough 21a that is thus formed in situ is separately shown and designated by reference numeral 27.

Although this invention has been described primarily in terms of a feedthrough for a lithium battery cell, other applications are possible where it is desired to avoid the use of feedthroughs that are made of brittle or difficult to work with materials such as glass, ceramic materials, glass-ceramic materials or the like. One such use that is illustrated in FIG. 1 is in connection with feedthroughs 25, often ceramic, between the encasement portion 12, often titanium, and the encapsulated connector assembly 14 of the cardiac pacer 11. Typically, such ceramic feedthroughs 25 are encapsulated within a moisture-tight, tissue-compatible casing, usually a transparent epoxy resin or acrylic material. The wires which exit the titanium encasement portion 12 through the ceramic feedthroughs are those which join the pacer circuitry and the connectors for the pacing lead or leads (not shown) of the cardiac pacer assembly.

It is to be appreciated that this invention can be embodied in various forms and therefore is to be construed and limited only by the scope of the appended claims.

We claim:

1. A method of providing a feedthrough member for securely mounting a conductive wire through a casing wall and for insulating the conductive wire from the casing, comprising:

providing a casing having a wall with an opening therethrough;

positioning a conductive wire within and generally parallel to the axis of the opening through the casing;

forming in situ at least a portion of a feedthrough member within said opening, said in situ forming procedure including inserting a polymeric material within and in contact with said casing wall opening and said conductive wire, said in situ forming procedure further including subsequently curing said polymeric material therewithin to form a completed polymeric feedthrough member that has a conductive wire mounted therethrough and adhered thereto and that is adhered to the casing wall opening.

2. The method according to claim 1, wherein said curing step of the in situ forming procedure is carried out at a temperature substantially lower than the melting point of a glass material.

3. The method according to claim 1, wherein said in situ forming procedure is carried out in the absence of applying any external heat energy source to the polymeric material.

4. The method according to claim 1, wherein said curing step of the in situ forming procedure is carried out under ambient temperature conditions.

5. The method according to claim 1, wherein said in situ forming procedure includes generally maintaining the generally parallel position of the conductive wire that is achieved by said conductive wire positioning step.

6. The method according to claim 1, wherein said in situ forming procedure forms the entire feedthrough member in situ from the polymeric material that is cured while within the casing wall opening.

7. The method according to claim 1, wherein said in situ forming procedure includes providing a preformed, undersized feedthrough, and said polymeric material inserting step includes flowing uncross-linked polymeric material between the undersized feedthrough and the casing wall opening as well as between the undersized feedthrough and the conductive wire.

8. The method according to claim 7, wherein said preformed, undersized material had been formed from polymeric material having substantially the same chemical structure as the uncross-linked polymeric material of the flowing step.

9. The method according to claim 1, wherein said polymeric material of the in situ forming procedure is a polyimide.

10. The method according to claim 1, wherein said polymeric material of the in situ forming procedure is polyphenylene sulfide.

11. The method according to claim 1, wherein said polymeric material of the in situ forming procedure is formed from an organic solvent system including cross-linked polymeric material.

12. The method according to claim 1, wherein said polymeric material of the in situ forming procedure is a powdered polymeric material.

13. The method according to claim 1, wherein said polymeric material of the in situ forming procedure includes a filler.

14. The method according to claim 1, wherein said in situ forming procedure includes forming an undercut portion of the feedthrough during said curing step.

* * * * *

UNITED STATES PATENT AND TRADEMARK OFFICE
CERTIFICATE OF CORRECTION

PATENT NO. : 4,598,466

DATED : July 8, 1986

INVENTOR(S) : Alvaro Arenas, Thomas O. Bales and John William Box

It is certified that error appears in the above—identified patent and that said Letters Patent is hereby corrected as shown below:

On the title page:

Under "Inventor:", "John W. Box" should read --John William Box--.
Column 3, line 46, "exansion" should read --expansion--.
Column 4, line 19, "it" should read --is--.

Signed and Sealed this

Fourteenth Day of April, 1987

Attest:

DONALD J. QUIGG

Attesting Officer

Commissioner of Patents and Trademarks